United States Patent
Sakurai

(10) Patent No.: US 10,647,334 B2
(45) Date of Patent: May 12, 2020

(54) GAP FILLER

(71) Applicant: KYOSAN ELECTRIC MFG. CO., LTD., Yokohama-shi, Kanagawa (JP)

(72) Inventor: Ikuo Sakurai, Tachikawa (JP)

(73) Assignee: KYOSAN ELECTRIC MFG. CO., LTD., Yokohama-shi, Kanagawa (JP)

(*) Notice: Subject to any disclaimer, the term of this patent is extended or adjusted under 35 U.S.C. 154(b) by 83 days.

(21) Appl. No.: 16/137,997

(22) Filed: Sep. 21, 2018

(65) Prior Publication Data

US 2019/0092350 A1     Mar. 28, 2019

Related U.S. Application Data

(63) Continuation of application No. PCT/JP2016/059336, filed on Mar. 24, 2016.

(51) Int. Cl.
*B61B 1/02* (2006.01)

(52) U.S. Cl.
CPC ..................... *B61B 1/02* (2013.01)

(58) Field of Classification Search
CPC .. B61B 1/02; B60R 3/02; B60R 3/002; B60R 2013/046; A61G 3/061; A61G 3/067; A61G 3/062; Y10S 414/134; B61D 23/02; B61D 47/00; B60P 1/433
USPC ........................................................ 105/436
See application file for complete search history.

(56) References Cited

U.S. PATENT DOCUMENTS

| | | | | |
|---|---|---|---|---|
| 2,118,557 A | * | 5/1938 | Hamilton | B60R 3/02 280/166 |
| 3,833,240 A | * | 9/1974 | Weiler | B60R 3/02 280/166 |
| 3,887,217 A | * | 6/1975 | Thomas | B60R 3/02 280/166 |
| 4,110,673 A | * | 8/1978 | Magy | B60R 3/02 105/444 |
| 4,116,457 A | * | 9/1978 | Nerem | B60R 3/02 280/166 |
| 6,325,397 B1 | * | 12/2001 | Pascoe | B60R 3/02 280/163 |
| 8,297,635 B2 | * | 10/2012 | Agoncillo | B60R 3/02 280/163 |

(Continued)

FOREIGN PATENT DOCUMENTS

| | | | |
|---|---|---|---|
| EP | 0 738 642 | * | 10/1996 |
| JP | 2005-014805 A | | 1/2005 |

(Continued)

*Primary Examiner* — Mark T Le
(74) *Attorney, Agent, or Firm* — Muncy, Geissler, Olds & Lowe, P.C.

(57) ABSTRACT

A first link mechanism section converts linear motion of a driving slider into swing motion of a swing end roller, and swings the swing end roller in cooperation with a second link mechanism section. An output end roller of the second link mechanism section engages in a guide groove in a driven slider fixed to a gap filler plate to move the gap filler plate linearly. In a fully protruded state and a fully stored state of the gap filler plate, the direction of acting force of the roller contact surface pressing the swing end roller aligns with a straight line connecting the swing end roller and a swing shaft of a first link lever section to act as a lock. The guide groove is formed orthogonal or almost orthogonal to movement directions of the gap filler plate.

8 Claims, 11 Drawing Sheets

(56) References Cited

U.S. PATENT DOCUMENTS

2019/0092349 A1 3/2019 Sakurai

FOREIGN PATENT DOCUMENTS

| JP | 2007-022335 A | 2/2007 |
| JP | 2014-125060 A | 7/2014 |
| JP | 5688170 B1 | 3/2015 |
| KR | 20-0193608 Y1 | 9/2000 |

* cited by examiner

[SEC. A-A]

[SEC. B-B]

GAP FILLER

CROSS REFERENCE TO RELATED APPLICATION

This application is a continuation of International Patent Application No. PCT/JP2016/059336, having an international filing date of Mar. 24, 2016, which designated the United States, the entirety of which is incorporated herein by reference.

BACKGROUND

The present invention relates to a gap filler that is installed at a platform in a railroad station to fill the gap between a train and the platform.

In recent years, gap fillers have been installed at platforms in an increasing number of stations. The platform gap filler is a device that protrudes a gap filler plate from the platform to reduce the gap between a train and the platform at the time of passengers' getting on and off. The platform gap filler stores the gap filler plate on the platform side at times other than during passengers' getting on and off, and protrudes the same to the railway track side at the time of passengers' getting on and off to narrow the gap between the platform and the train and prevent passengers' falling (for example, refer to JP-A-2005-14805).

A platform gap filler includes a brake mechanism and a lock mechanism that prevent displacement of a gap filler plate by reaction force of passengers' treading on the gap filler plate when the gap filler plate protrudes from the platform at the time of passengers' getting on and off.

The lock mechanism is operated by electromagnetic force as described in JP-A-2005-14805 and thus changing the locked state requires electric power. In addition, when power supply is shut off before the gap filler plate is fully protruded or fully stored, the brake in the electric drive mechanism is activated to make manual driving disabled. The train cannot be started with the gap filler plate in a position not fully protruded or stored. That is, the train cannot be started until the power supply recovers. To avoid such a situation, there is a need for a backup power supply enabling the release of the brake such that an instruction for releasing the brake can be issued in the event of a fault or power discontinuity.

Further, a platform may be located in not only a linear section but also a curve section of a railway track. To install the gap filler in the curve section of the platform, it is necessary to decide the amount of protrusion of the gap filler plate at each of installation positions because the gap between a train and the platform varies depending on the position of the door. Accordingly, it is necessary to design and manufacture the gap filler suited to the installation position. In this case, larger numbers of unique components and devices are used to cause a price increase. In addition, there may occur erroneous orders and wrong assembly at installation sites. JP-A-2005-14805 describes a method for avoiding this problem by which the brake is applied in the fully protruded position to fix the gap filler plate by braking force. In this case, however, if braking force is decreased due to the wear of the brake, the gap filler plate no longer can be fixed and the brake needs inspection.

The protruding action of the gap filler plate from the fully stored state to the fully protruded state desirably takes place such that the gap filler plate starts quickly and efficiently and then approaches more slowly to the fully protruded state.

SUMMARY

According to one aspect of the invention, there is provided a gap filler that protrudes a gap filler plate to a track side to prevent passengers' falling from a platform, comprising:

a drive mechanism section;

a first link lever section having a driving end and a driven end, the driving end being moved by driving of the drive mechanism section and the driven end being swung by movement of the driving end;

a second link lever section having an input end section and an output end section, the input end section having a contact surface to contact the driven end and the output end section having a roller section changeable in installation position in a predetermined direction and being swung by movement of the input end section; and a driven slider that has a guide groove in which the roller section is capable of rolling to convert swing motion of the output end section into linear motion and move the gap filler plate in forward and backward movement directions, wherein an engagement relationship between the first link lever section and the second link lever section constitutes an inverse operation preventive structure that, when the gap filler plate is in either a fully protruded state or a fully stored state, enables only forward motion transfer from the first link lever section to the second link lever section, the guide groove is formed in a direction orthogonal or almost orthogonal to forward and backward movement directions of the gap filler plate, and the predetermined direction and the direction of the guide groove are parallel to each other in the fully stored state.

DESCRIPTION OF EXEMPLARY EMBODIMENTS

According to the embodiment, it is possible to implement, as a lock mechanism for a gap filler, a lock mechanism simple in mechanical structure, inexpensive, and excellent in durability without needing electric power. Additionally, the protrusion amount of a gap filler plate is to be changeable.

According to a first aspect of the invention, there is provided a gap filler that protrudes a gap filler plate to a track side to prevent passengers' falling from a platform, comprising:

a drive mechanism section;

a first link lever section having a driving end and a driven end, the driving end being moved by driving of the drive mechanism section and the driven end being swung by movement of the driving end;

a second link lever section having an input end section and an output end section, the input end section having a contact surface to contact the driven end and the output end section having a roller section changeable in installation position in a predetermined direction and being swung by movement of the input end section; and a driven slider that has a guide groove in which the roller section is capable of rolling to convert swing motion of the output end section into linear motion and move the gap filler plate in forward and backward movement directions, wherein an engagement relationship between the first link lever section and the second link lever section constitutes an inverse operation preventive structure that, when the gap filler plate is in either a fully protruded state or a fully stored state, enables only forward motion transfer from the first link lever section to the second link lever section, the guide groove is formed in a direction orthogonal or almost orthogonal to forward and backward movement directions of the gap filler plate, and the predetermined direction and the direction of the guide groove are parallel to each other in the fully stored state.

In the gap filler, an angle formed by a central axis of the output end section and a central axis of the input end section may be an obtuse angle starting at a center of a swing shaft of the second link lever section.

The gap filler may further comprise a movement restriction section that, for a forward and backward movable range of the gap filler plate, makes changeable a protrusion limit position according to the installation position of the roller section and fixes a storage limit position.

In the gap filler the output end section may have a plurality of bolt holes into which a through bolt inserted into a rotation shaft of the roller section is screwed, the bolt holes being aligned in the predetermined direction.

In the gap filler, the output end section may have a long hole and a fitting concave-convex section, the long hole being longer in the predetermined direction into which the through bolt is inserted via the roller section and the roller seat, the fitting concave-convex section fitting to the roller seat provided around the long hole.

Figure 1:
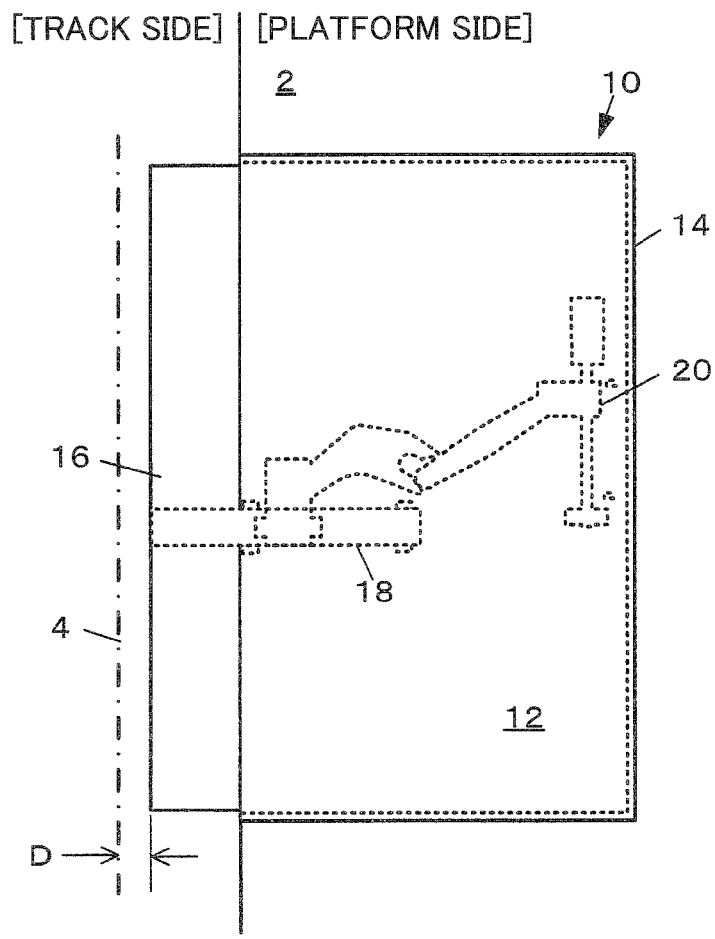
FIG. 1(1) is a top view of a configuration example of a platform gap filler in a installed state and FIG. 1(2) is a side view of the same.
Figure 1:
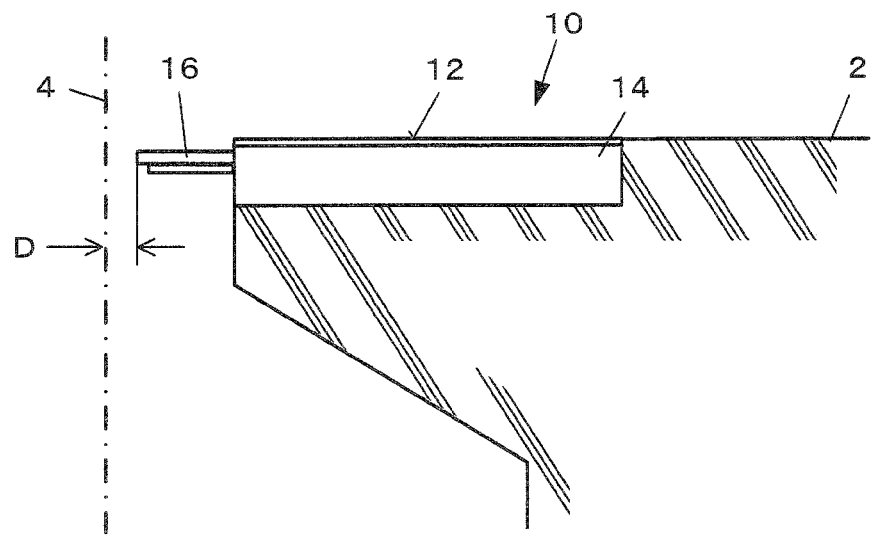

A platform gap filler as an example of an embodiment to which the present invention is applied will be described in outline as follows. FIG. 1(1) is a top view of a configuration example of a platform gap filler 10 in an installed state and FIG. 1(2) is a side view of the same. The platform gap filler 10 is fixed in an installation space that is recessed on the top of a side edge of a platform 2 in a station.

Figure 2:
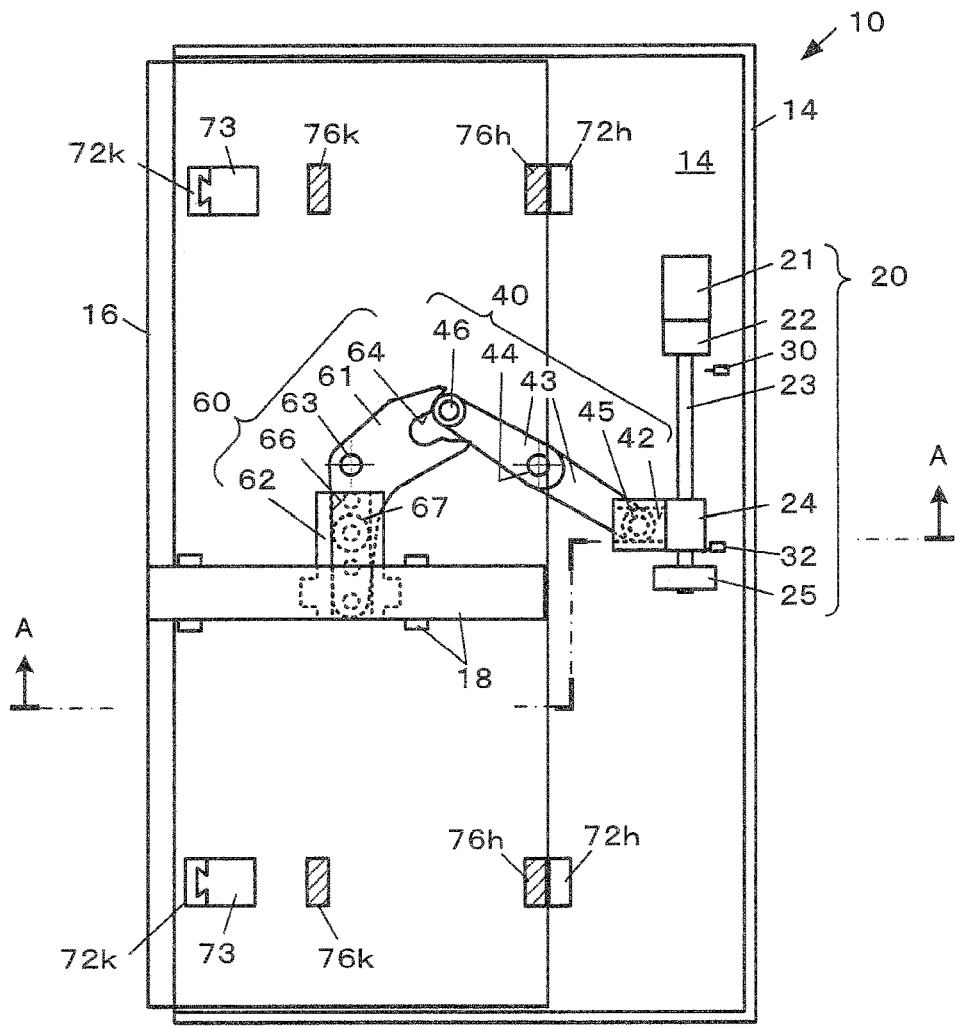
FIG. 2(1) is a top view of an example of internal structure of the platform gap filler in a fully stored state, and FIG. 2(2) is an enlarged partial view of the same.
Figure 2:
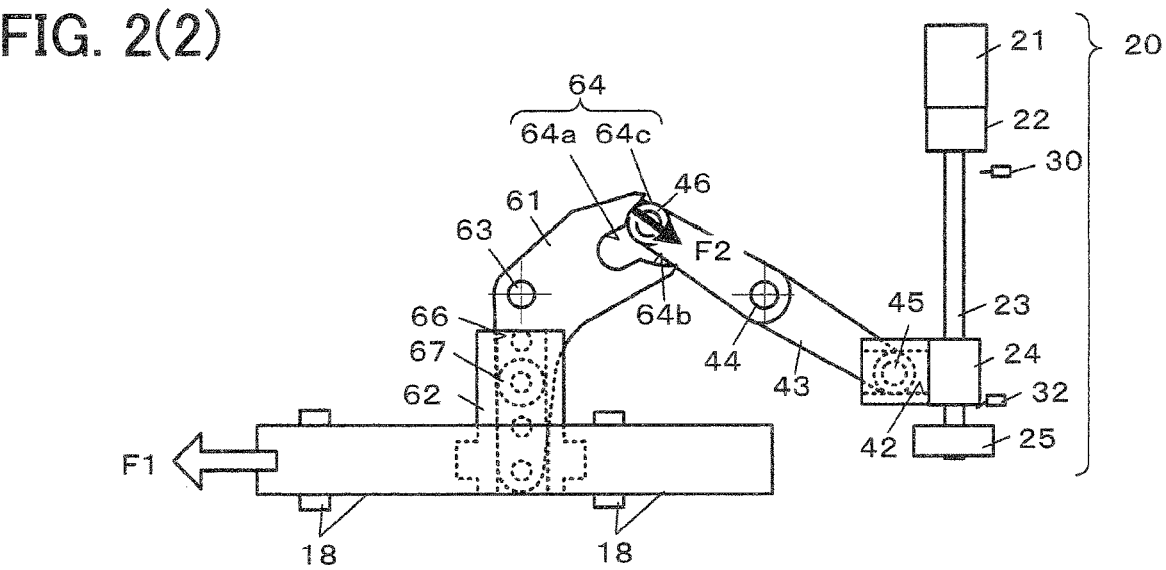

The platform gap filler 10 defines a thin cuboid internal space opened to the track side by a main frame 14 fixed in the installation space and a top plate 12 acting as a cover of the main frame 14, and has a gap filler plate 16 supported in an almost horizontally slidable manner in the internal space by a ball-bearing slide rail 18 (see FIG. 2). The platform gap filler 10 can move the gap filler plate 16 forward and backward to the track side and the platform side by a drive mechanism section 20.

At times other than during passengers' getting on and out a train 4, the gap filler plate 16 is stored in the internal space and kept in a movement suppressed state so that the track-side end of the gap filler plate 16 does not protrude to the railway track side beyond a regulated position. This state will be called "fully stored state".

At times of passengers' getting on and out the train 4, as the drive mechanism section 20 is activated, the gap filler plate 16 is automatically shifted to a movable state. The gap filler plate 16 is protruded to the track side to reduce a gap D between the platform and the train 4 and prevent passengers from falling between the platform and the train. This state will be called "fully protruded state". FIGS. 1(1) and 1(2) both illustrate the "fully protruded state".

In the fully protruded state, the gap filler plate 16 is automatically switched from the movable state to the movement suppressed state. The gap filler plate 16 is kept in the current position against an input from the gap filler plate 16 side (for example, reaction force or the like generated during passengers' treading on the gap filler plate 16 and getting on the train). That is, the gap filler plate 16 is brought into a locked state.

Then, after passengers' getting on and off, the drive mechanism section 20 operates inversely. Even though the gap filler plate 16 is in the movement suppressed state, when the forward transfer of driving force is started by the activation of the drive mechanism section 20, the gap filler plate 16 is automatically switched to the movable state. Then, the gap filler plate 16 is moved to the platform side and returned to the "fully stored state" by the transferred power. The gap filler plate 16 is automatically brought into the movement suppressed state.

Next, the internal structure of the platform gap filler 10 will be described in detail.

Figure 3:
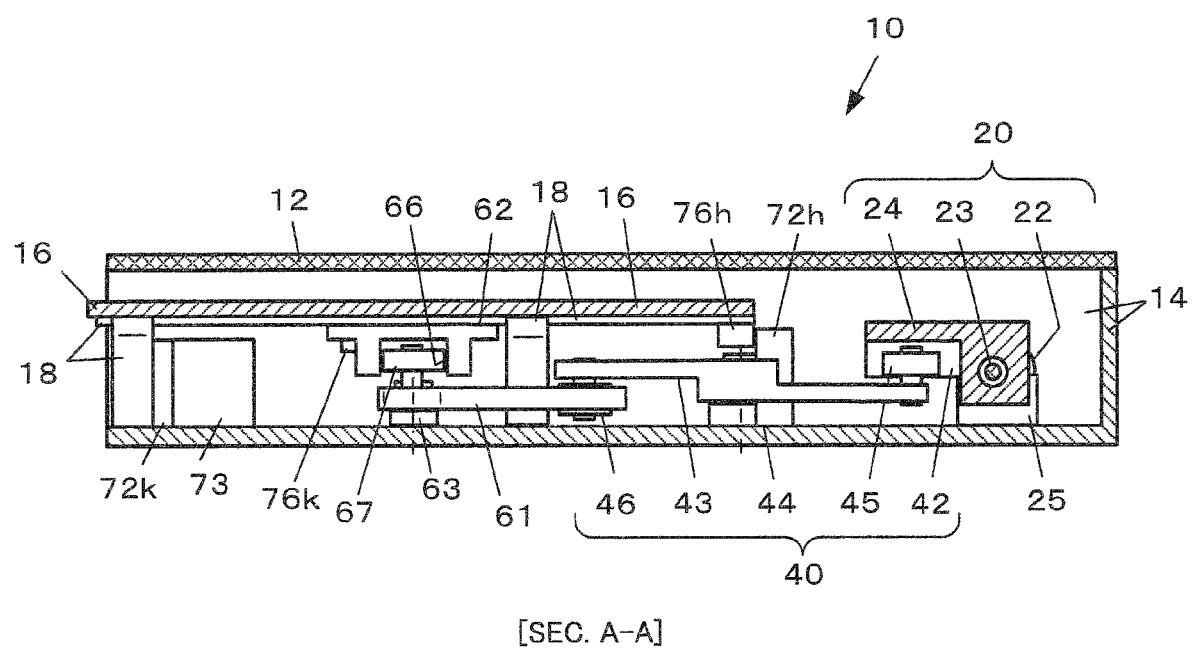
FIG. 3 is a cross-sectional view of FIG. 2(1) taken along line A-A.

FIGS. 2 and 3 are diagrams illustrating the internal structure of the platform gap filler 10 stored in the internal space according to the present embodiment, which illustrate the fully stored state. FIG. 2(1) is a perspective top view of the top plate 12, the main frame 14, and the gap filler plate 16, and FIG. 2(2) is an enlarged perspective partial view of the same. FIG. 3 is a cross-sectional view of FIG. 2(1) taken along line A-A.

The drive mechanism section 20 includes an electric motor 21 that is electrically controlled by a control device not illustrated, a deceleration mechanism 22 that decelerates appropriately the rotation of an output shaft of the electric motor 21, a ball screw section 23 that is coupled to an output shaft of the deceleration mechanism 22, a driving slider 24 that is slid by the rotation of the ball screw section 23, and a bearing 25 that supports pivotally the leading end of the ball screw section 23. That is, the electric motor 21 and the deceleration mechanism 22 act as a driving section that drives rotationally the ball screw section 23. That is, the ball screw section 23 and the driving slider 24 act as a linear motion mechanism. The driving slider 24 is also part of a first link mechanism section 40 described later. The linear motion mechanism may be formed from a rack pinion, a chain, a timing belt, and the like.

In relation to the drive mechanism section 20, the main frame 14 is provided as appropriate with detection sensors to detect the position of the driving slider 24 along the ball screw section 23. In the present embodiment, there are provided a fully protrusion detection sensor 30 to detect the position of the driving slider 24 when the gap filler plate 16 is in the fully protruded state and a fully storage detection sensor 32 to detect the position of the driving slider 24 when the gap filler plate 16 is in the fully stored state. The fully protrusion detection sensor 30 and the fully storage detection sensor 32 are implemented by limit switches, for example, that output detection signals to the control device (not illustrated) of the electric motor 21 for use in rotational control of the electric motor 21.

The drive mechanism section 20 and the gap filler plate 16 cooperate with each other via the first link mechanism section 40 and a second link mechanism section 60.

The first link mechanism section 40 is a mechanism section that converts linear motion of the driving slider 24 driven by the drive mechanism section 20 into swing motion and has a roller guide 42 provided in the driving slider 24 and a first link lever section 43 as a swing body. The first link lever section 43 as a swing body is driven and operated by the drive mechanism section 20 to produce swing motion.

The first link lever section 43 is linear in shape in a top view, and is rotatably pivoted by a swing shaft 44 erected almost vertically from the main frame 14. The first link lever section 43 has a driving end roller 45 that rolls in the guide groove in the roller guide 42 and is coupled to one end (driving end) on the drive mechanism section 20 side, and has a swing end roller 46 at the other end (driven end) on the opposite side with the swing shaft 44 therebetween.

The second link mechanism section 60 is a mechanism section that converts swing motion produced by the first link mechanism section 40 driven by the drive mechanism section 20 into linear motion of a driven slider 62 to move the gap filler plate 16 in forward and backward directions, and has a second link lever section 61 and the driven slider 62.

The second link lever section 61 has a bend shape (for example, almost L shape or almost dogleg shape) in a top view. The second link lever section 61 is rotatably pivoted at the bend by a swing shaft 63 erected almost vertically from the main frame 14. The second link lever section 61 has a roller contact surface 64 where the swing end roller 46 of the first link mechanism section 40 contacts and rolls at one end closer to the drive mechanism section 20 than the bend (the end closer to the first link lever section 43: input end section). The second link lever section 61 has an output end roller 67 that rolls in the guide groove in the roller guide groove 66 on the lower surface of the driven slider 62 at the other end (output end section). The attachment position of the output end roller 67 is changeable.

The driven slider 62 is fixed to the back side of the slide rail 18 fixed by a bolt or the like to the back side of the gap filler plate 16. The guide groove 66 forms a groove in a direction orthogonal or almost orthogonal to the forward and backward movement directions of the gap filler plate 16.

As illustrated in the enlarged view of FIG. 2(2), the roller contact surface 64 of the second link lever section 61 has a changeover surface 64*a* almost U-shaped in a top view and a fully protruded state lock surface 64*b* and a fully stored state lock surface 64*c* that run in a line from the both ends of the changeover surface in the rotation direction of the lever.

The fully stored state lock surface 64*c* has a curve surface around the swing shaft 44 of the first link lever section 43 in the positional relationship between the first link lever section 43 and the second link lever section 61 in the fully stored state. The fully stored state lock surface 64*c* is designed to satisfy a geometric condition for a predetermined pairing relationship between the first link mechanism section 40 and the second link mechanism section 60 in the fully stored state. The contact position of the swing end roller 46 on the fully stored state lock state 64*c* resides on a straight line (or almost on a straight line) connecting the swing end roller 46 and the swing shaft 44.

As a result, in the fully stored state, the gap filler plate 16 can be brought into the movement suppressed state. Specifically, when acting force F1 for moving the gap filler plate 16 in the protrusion direction (thick white arrow in FIG. 2(2)) is exerted on the gap filler plate 16 in the stored state as illustrated in FIG. 2, the driven slider 62 presses the output end roller 67 in the protrusion direction (track direction). Accordingly, the second link lever section 61 develops a clockwise torque, and the roller contact surface 64 presses the swing end roller 46 of the first link lever section 43 by acting force F2 (thick black arrow in FIG. 2(2)). However, due to the geometric relationship described above, the direction of the acting force F2 aligns with the straight line connecting the swing end roller 46 and the swing shaft 44. Accordingly, the acting force F2 is borne by the swing shaft 44 so that the first link lever section 43 is not rotated. That is, the gap filler plate 16 is brought into a locked state.

Similarly, the fully protruded state lock surface 64*b* has a curve surface around the swing shaft 44 of the first link lever section 43 in the positional relationship between the first link lever section 43 and the second link lever section 61 in the fully protruded state. The fully protruded state lock surface 64*b* is designed to satisfy a geometric condition for a predetermined pairing relationship between the first link mechanism section 40 and the second link mechanism section 60 in the fully protruded state. The contact position of the swing end roller 46 on the fully protruded state lock surface 64*b* resides on a straight line (or almost on a straight line) connecting the swing end roller 46 and the swing shaft 44. That is, in the fully protruded state, the gap filler plate 16 can be kept in the movement suppressed state.

Figure 4:
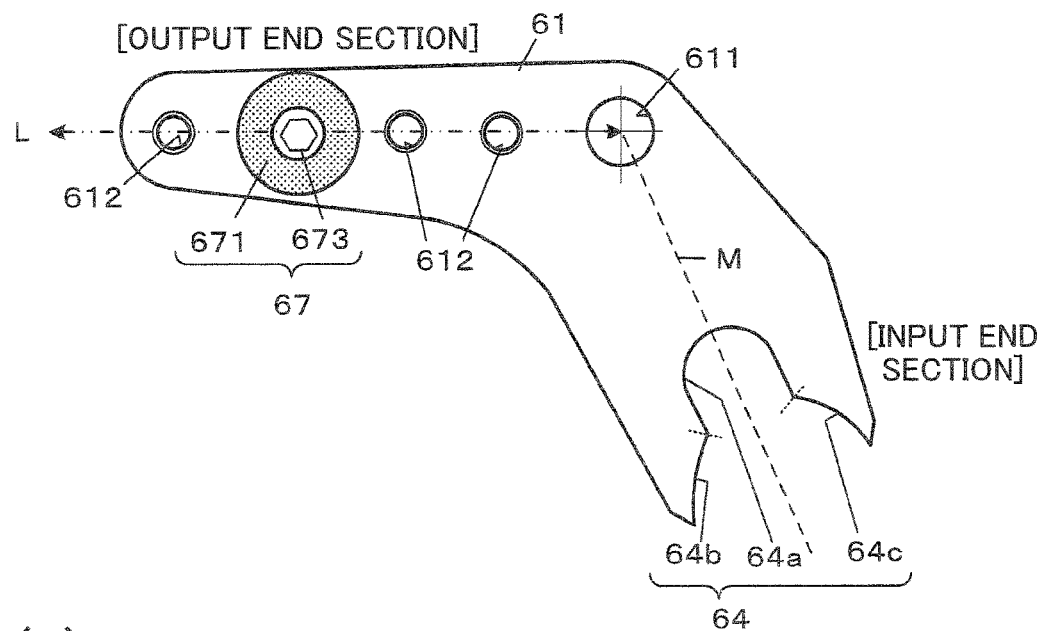
FIG. 4(1) is a top view of a configuration example of a second link lever section and FIG. 4(2) is a side perspective view of the same as seen from a roller contact surface side.
Figure 4:
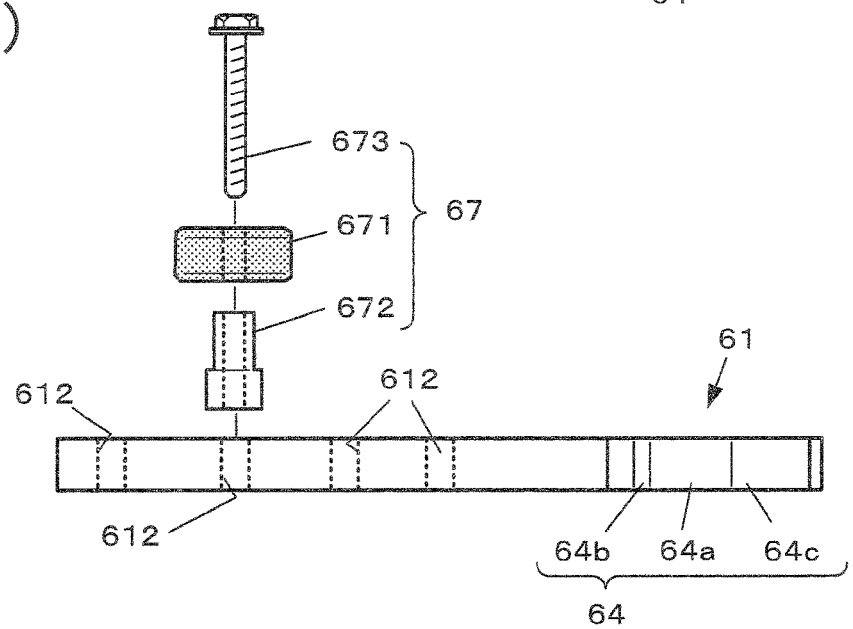

FIG. 4(1) is a top view of a configuration example of the second link lever section 61 in the present embodiment and FIG. 4(2) is a side perspective view of the same as seen from the roller contact surface 64 side.

The output end of the second link lever section 61 has a plurality of bolt holes 612 different in distance from an insertion hole 611 in the swing shaft 63 provided in series along a displacement installation-capable direction L. In the present embodiment, the displacement installation-capable direction L is set to pass through the center of the insertion hole 611 in the swing shaft 63, more specifically, the center of the swing shaft 63. In addition, in the present embodiment, there are three bolt holes 612. However, the number of the bolt holes 612 may be any number other than one. The intervals between the bolt holes 612 can be set as appropriate. The output end roller 67 is inserted into any one of the plurality of bolt holes 612.

The output end roller 67 is installed such that a roller body 671 with a resin ring fitted to the outer periphery of a bearing and a roller seat 672 for height adjustment are coaxially inserted and screwed into the bolt hole 612 by a through bolt 673. Changing the bolt hole 612 for fixing the output end roller 67 makes it possible to change the lever ratio of the second link mechanism section 60 (that is, the rate of conversion from swing motion to linear motion) and change the protrusion amount of the gap filler plate 16.

The displacement installation-capable direction L constituting a central axis from the center of the insertion hole 611 in the swing shaft to the output end section of the second link lever section 61 and a central axis M from the center of the insertion hole 611 to the roller contact surface 64 of the input end section of the second link lever section 61 (central axis in the connecting direction of the three surfaces, that is, the fully protruded state lock surface 64b, the changeover surface 64a, and the fully stored state lock surface 64c) form an obtuse angle.

In correspondence with the capability of adjustment of the protrusion amount of the gap filler plate 16 by changing the lever ratio of the second link mechanism section 60, in the present embodiment, a movement restriction section is also made adjustable for limiting the forward and backward movable range of the gap filler plate 16.

Specifically, as illustrated in FIGS. 2 and 3, as the movement restriction section, a track-side stopper 72k and a platform-side stopper 72h are erected on the bottom surface of the main frame 14 along the movement directions (forward and backward movement directions) of the gap filler plate 16. In addition, a track-side engagement projection 76k and a platform-side engagement projection 76h are provided downward on the lower surface of the gap filler plate 16 along the movement directions (forward and backward movement directions) of the gap filler plate 16.

When the gap filler plate 16 moves in the protrusion direction, the track-side engagement projection 76k abuts and engages by the track-side surface with the track-side stopper 72k (or the spacer 73) to regulate the protrusion limit position. On the other hand, when the gap filler plate 16 moves in the storage direction, the platform-side engagement projection 76h abuts and engages by the platform-side surface with the platform-side stopper 72h to regulate the storage limit position. That is, the distance between the track-side stopper 72k and the platform-side stopper 72h constitutes the movement restricted distance of the gap filler plate 16.

Figure 5:
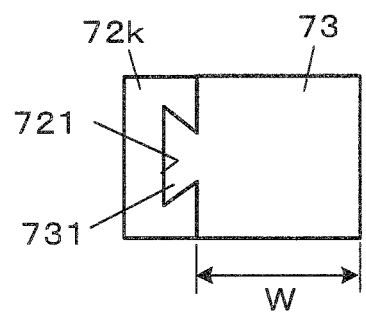
FIG. 5(1) is a top view of a configuration example of a track-side stopper, and FIG. 5(2) is a side view of the same.
Figure 5:
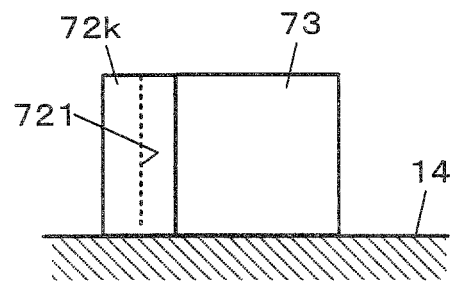

Moreover, a spacer 73 is detachably attached to the platform-side surface of the track-side stopper 72k to adjust the movement restricted distance. Specifically, as illustrated in FIG. 5(1), the track-side stopper 72k has a perpendicular engagement groove 721 in a top view in the platform-side surface. The engagement groove 721 is designed such that an engagement projection 731 of the spacer 73 is insertable and extractable in the perpendicular direction but is not insertable or extractable in the horizontal direction.

A plurality of kinds of spacers 73 different in adjustment thickness W (the thickness of the gap filler plate 16 as seen in the movement direction) are prepared. Selecting the kind of the spacer 73 to be attached to the track-side stopper 72k (including the case of not attaching) depending on the setting of the lever ratio of the second link mechanism section 60, that is, which of the bolt holes 612 into which the output end roller 67 is to be inserted makes it possible to adjust appropriately the movement restricted distance of the gap filler plate 16.

The protrusion amount of the gap filler plate 16 can be adjusted in:
step [1] removing the top plate 12;
step [2] detaching the gap filler plate 16 from the slide rail 18;
step [3] detaching the slide rail 18 and the driven slider 62;
step [4] changing the attachment position of the output end roller 67; and
step [5] changing the spacer 73.

As a matter of the course, for labor saving in steps [1] to [3], a first open/close lid section for changing the attachment position of the output end roller 67 (also called adjustment window or inspection hole) and a second open/close lid section for changing the spacer 73 may be provided on the top plate 12 and the gap filler plate 16.

Operations of the platform gap filler 10 will be described below.

Figure 6:
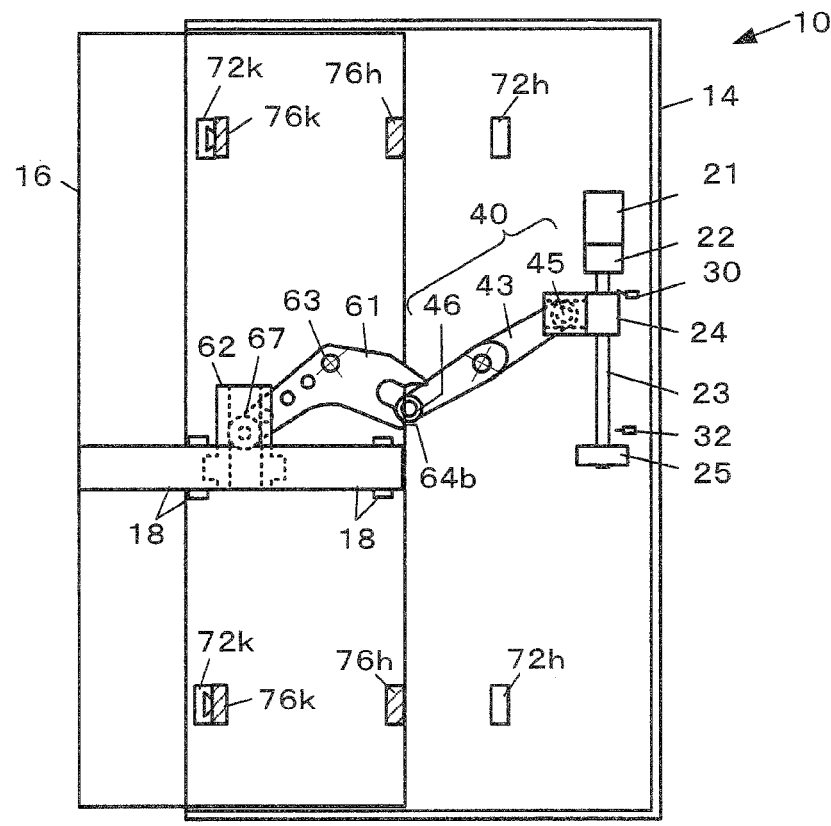
FIGS. 6(1) to 6(2) are enlarged views of a principle mechanism for moving the gap filler plate, and FIG. 6(1) illustrates a fully protruded state, and FIG. 6(2) illustrates the fully stored state.
Figure 6:
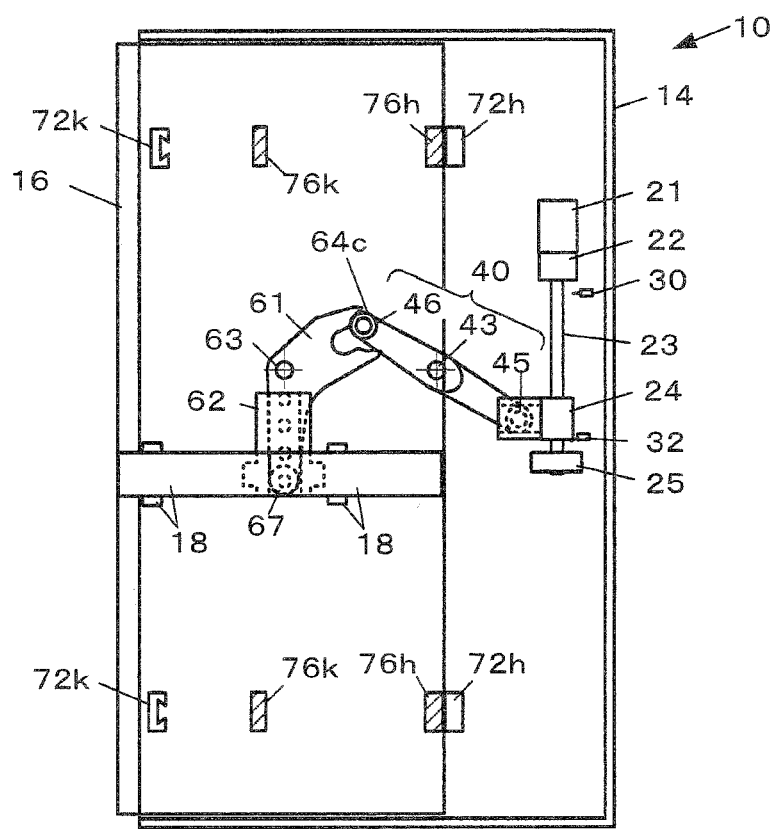

FIGS. 6(1) to 6(2) are enlarged views of a principle mechanism for moving the gap filler plate 16, and FIG. 6(1) illustrates the fully protruded state, and FIG. 6(2) illustrates the fully stored state.

In the example of FIG. 6(1), the output end roller 67 is inserted into the bolt hole 612 most distant from the swing shaft 63 of the second link lever section 61 (see FIG. 4), and the spacer 73 is not attached to the track-side stopper 72k. Thus, the protrusion amount of the gap filler plate 16 reaches its maximum.

In the platform gap filler 10 in the fully protruded state, the swing end roller 46 of the first link lever section 43 is in abutment with the fully protruded state lock surface 64b of the roller contact surface 64. As described above, in this state, the link mechanism is not activated by inverse power transfer from the second link lever section 61 to the first link lever section 43. That is, the link mechanism connecting the gap filler plate 16 and the drive mechanism section 20 is in the locked state to lock the gap filler plate 16.

When the electric motor 21 is rotationally driven in a predetermined direction to store the gap filler plate 16, the driving slider 24 is moved (downward in FIGS. 6(1) to 6(2)) and the driving end roller 45 engaged with the roller guide 42 of the driving slider 24 is also moved. Accordingly, the first link lever section 43 rotates clockwise, and the swing end roller 46 moves from the fully protruded state lock surface 64b to the changeover surface 64a. That is, the link mechanism in the fully protruded state is unlocked automatically and smoothly.

Then, when the swing end roller 46 moves to the changeover surface 64a, the swing end roller 46 fits in the inner space almost U-shaped in a top view formed by the changeover surface 64a, and the rotational motion of the first link lever section 43 rotates the second link lever section 61 counterclockwise. When the second link lever section 61 rotates counterclockwise, the output end roller 67 moves relatively to the platform side to move the driven slider 62 and the gap filler plate 16 to the platform side.

As the rotational driving of the electric motor 21 continues, the swing end roller 46 comes out of the changeover surface 64a and moves to the fully stored state lock surface 64c. When the driving slider 24 moves to a predetermined fully stored position, the electric motor 21 is stopped and brought into the state illustrated in FIG. 6(2).

In the platform gap filler 10 in the fully stored state, the swing end roller 46 of the first link lever section 43 is in abutment with the fully stored state lock surface 64c of the roller contact surface 64. As described above, in this state, the link mechanism is not activated by inverse power transfer from the second link lever section 61 to the first link lever section 43. That is, the link mechanism connecting the gap filler plate 16 and the drive mechanism section 20 is in the locked state to lock the gap filler plate 16.

That is, in the fully stored state, the alignment direction of the plurality of bolt holes 612 in the second link lever section 61 (the displacement installation-capable direction L) and the groove direction of the guide groove 66 of the driven slider 62 are parallel or almost parallel to each other.

When the electric motor 21 is rotationally driven in the direction opposite to the foregoing direction to protrude the gap filler plate 16 from the state of FIG. 6(2), the driving slider 24 is moved (upward in FIGS. 6(1) to 6(2)) and the driving end roller 45 engaged with the roller guide 42 is also moved. Accordingly, the first link lever section 43 rotates counterclockwise, and the swing end roller 46 moves from the fully stored state lock surface 64c to the changeover surface 64a. Accordingly, the link mechanism in the fully stored state is unlocked automatically and smoothly, and the gap filler plate 16 returns to the fully protruded state illustrated in FIG. 6(1).

Figure 7:
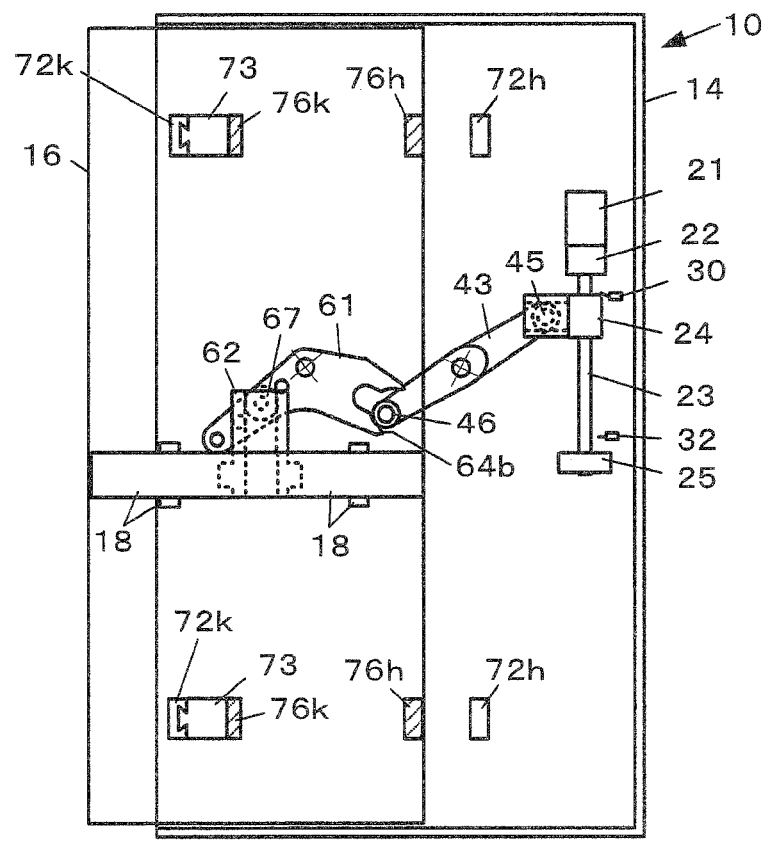
FIGS. 7(1) to 7(2) are enlarged views of the principle mechanism when the attachment position of an output end roller is changed from the state illustrated in FIGS. 6(1) to 6(2), and FIG. 7(1) illustrates the fully protruded state, and FIG. 7(2) illustrates the fully stored state when a setting of a discharge amount is changed.
Figure 7:
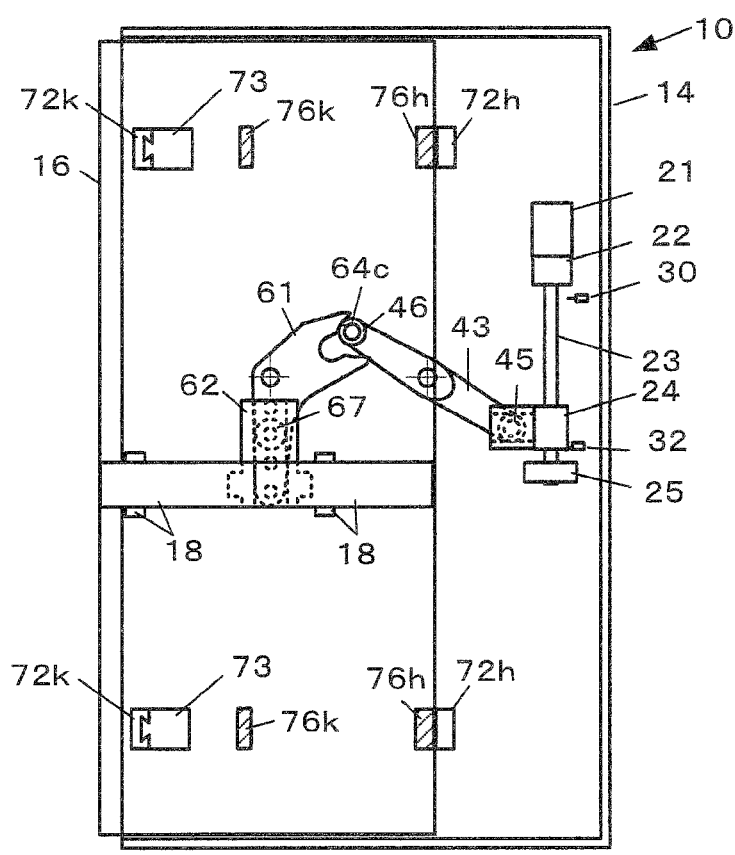

FIGS. 7(1) to 7(2) are enlarged views of a principle mechanism for moving the gap filler plate 16 when the attachment position of the output end roller 67 is changed from the position of FIGS. 6(1) to 6(2), that is, when the protrusion amount is changed. FIG. 7(1) illustrates the fully protruded state, and FIG. 7(2) illustrates the fully stored state.

In a comparison between FIG. 6(1) and FIG. 7(1), the protrusion amount of the driven slider 62 illustrated in FIGS. 7(1) to 7(2) is smaller due to the change of the attachment position of the output end roller 67. Along with this, the spacer 73 is attached to the track-side stopper 72k.

On the other hand, in a comparison between FIG. 6(2) and FIG. 7(2), the posture of the second link lever section 61 in the fully stored state is the same. That is, in the fully stored state as described above, the alignment direction of the plurality of bolt holes 612 in the second link lever section 61 (the displacement installation-capable direction L) and the groove direction of the guide groove 66 in the driven slider 62 are parallel or almost parallel to each other. Thus, even when the attachment position of the output end roller 67 is changed, the storage position of the driven slider 62 in the fully stored state remains unchanged. Therefore, the setting of the protrusion amount can be changed without the need for adjustment of the platform-side stopper 72h and the platform-side engagement projection 76h.

Focusing on the movement velocity of the gap filler plate 16 from the fully stored state to the fully protruded state, the guide groove direction of the guide groove 66 in the driven slider 62 in the fully stored state is orthogonal or almost orthogonal to the movement directions of the gap filler plate 16. Accordingly, the first link lever section 43 has a uniform rotation angle, whereas the output end roller 67 has a varying rotation angle. That is, the gap filler plate starts to move quickly and then approaches more slowly to the fully protruded state. This makes it possible to perform the protruding operation more efficiently than in the configuration in which the direction of the guide groove 66 in the driven slider 62 in the fully stored state is inclined with respect to the movement direction of the gap filler plate 16.

Figure 8:
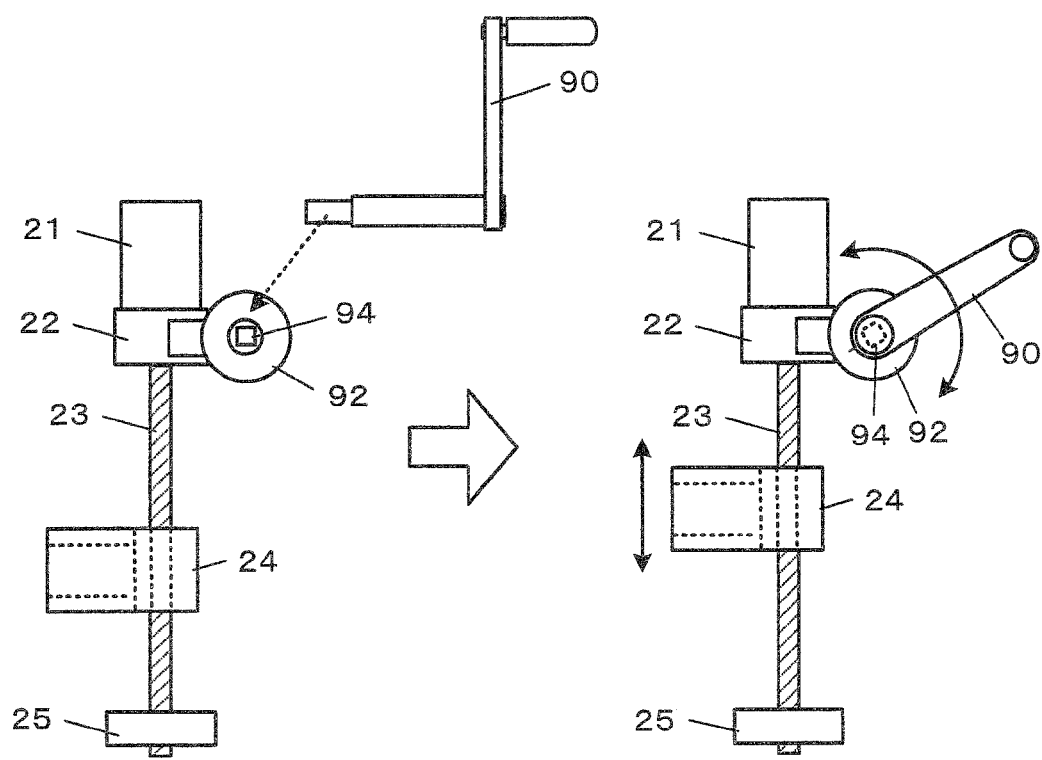
FIG. 8 is a diagram for describing manual operation of a drive mechanism section.

In the platform gap filler 10 in the present embodiment, as illustrated in FIG. 8, a hand-turned handle 90 can be attached to the deceleration mechanism 22 to rotate manually a gear mechanism 92. Specifically, when power supply to the platform gap filler 10 is shut off, inserting and coupling the hand-turned handle 90 into a coupling hole 94 in the gear mechanism 92 allows the ball screw section 23 to be rotated without electric power. Further preferably, a small door is installed in the top plate 12 to provide an access to the coupling hole 94 without having to remove the top plate 12.

According to the present embodiment, the movement suppressed state (locked state) and the movable state (unlocked state) of the gap filler plate 16 can be implemented by the mechanical structure. This eliminates the need for an electromagnetic brake and electric power for changing the locked state. Implementing the lock/unlock mechanism makes it possible to identify the degree of parts deterioration at a glance, thereby achieving reduction in the man-hours of maintenance checkup and improvement in the durability of the platform gap filler 10.

In addition, the position of the output end roller 67 at the output end section of the second link lever section 61 can be changed, and the position of the track-side engagement projection 76k can be changed as well. This makes it possible to adjust individually the protrusion amounts of the gap filler plates 16 in the platform gap fillers 10 under the same specifications. When the platform 2 is installed in the curve section of the railway track, the clearance between the installation place of the platform gap filler 10 and the train 4 varies depending on the installation position. The present embodiment is useful in such a case. That is, including the mechanism capable of adjustment of the protrusion amount of the gap filler plate 16 makes it possible to configure the platform gap fillers 10 different in protrusion amount at corresponding installation sites, thereby making a significant contribution to reduced manufacturing cost for the platform gap filler 10.

The protruding action of the gap filler plate 16 from the fully stored state to the fully protruded state takes place such that the gap filler plate 16 starts quickly and efficiently and then approaches more slowly to the fully protruded state.

[Modifications]

The mode of the present invention is not limited to the present embodiment but constituent elements can be added, omitted, and changed as appropriate.

[1]

For example, the linear motion mechanism formed by the ball screw section 23 and the driving slider 24 in the foregoing embodiment can be replaced by a rack-and-pinion linear motion mechanism or a belt-driven linear motion mechanism.

[2]

Figure 9:
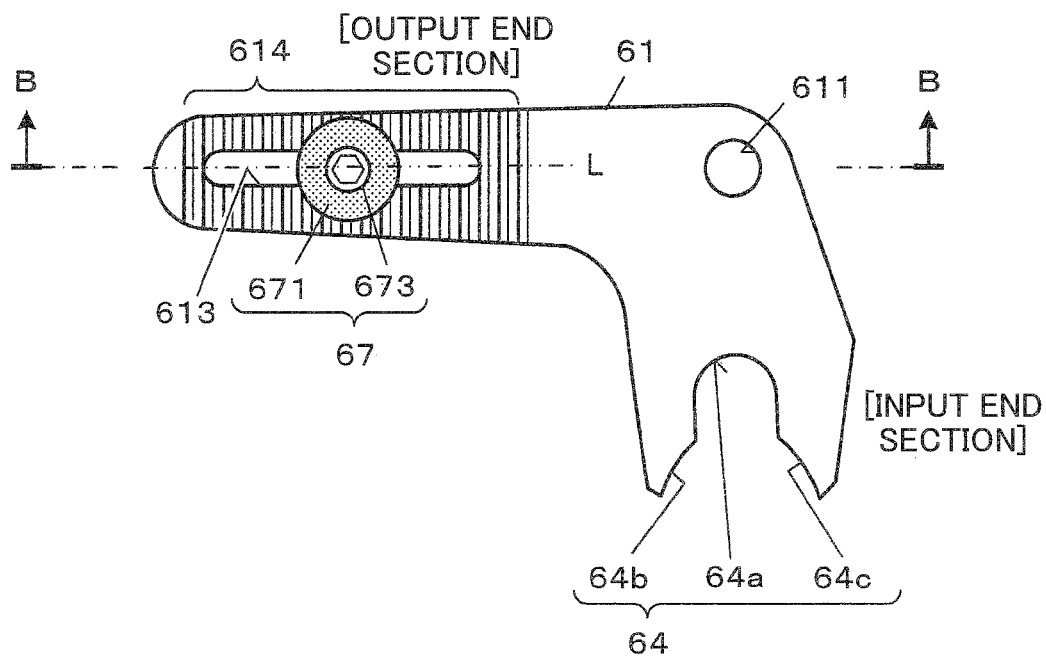
FIGS. 9(1) and 9(2) are diagrams illustrating a modification of an adjustment structure for the attachment position of the output end roller.
Figure 9:
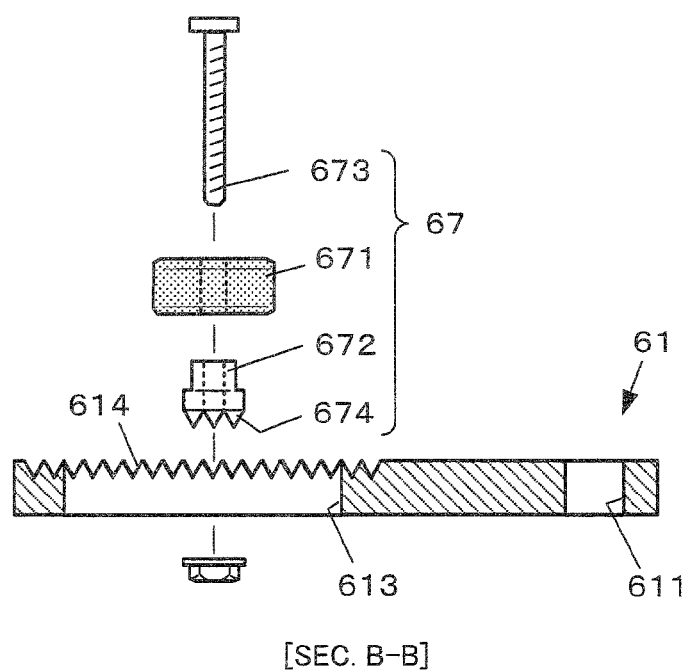

The structure for adjusting the attachment position of the output end roller 67 is not limited to the scheme based on the number and position of the bolt holes 612. For example, as illustrated in FIG. 9, a long hole 613 into which the through bolt 673 can be inserted is provided in the installation range of the output end roller 67 such that the longitudinal direction (the displacement installation-capable direction L) is parallel or almost parallel to the guide direction of the guide groove 66 in the driven slider 62 in the fully stored state. In addition, a fitting concave-convex section 614 is provided around the long hole 613. The through bolt 673 is inserted into the long hole 613 via the roller body 671 and the roller seat 672. The roller seat 672 may also have projections 674 to fit with the concave and convex portions in the fitting concave-convex section 614 such that the installation position of the output end roller 67 can be adjusted by the fitting position of the fitting concave-convex section 614 and the projections 674. In this case, the position of the output end roller 67 can be adjusted more finely than in the foregoing embodiment, depending on the pitch of the concave and convex portions in the fitting concave-convex section 614.

Figure 10:
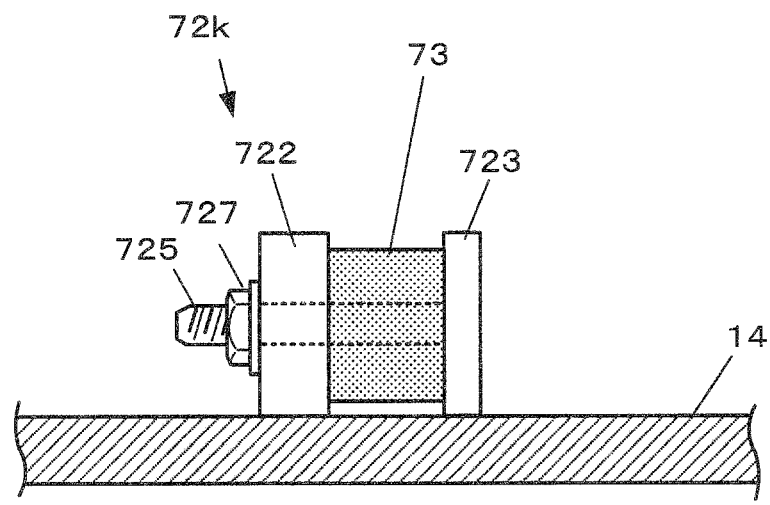
FIG. 10 is a diagram illustrating a modification of the track-side stopper.

In correspondence with this configuration, the track-side stopper 72k is preferably made capable of fine adjustment. Specifically, as illustrated in FIG. 10, the track-side stopper 72k has a base 722 and an engagement body 723.

Figure 11:
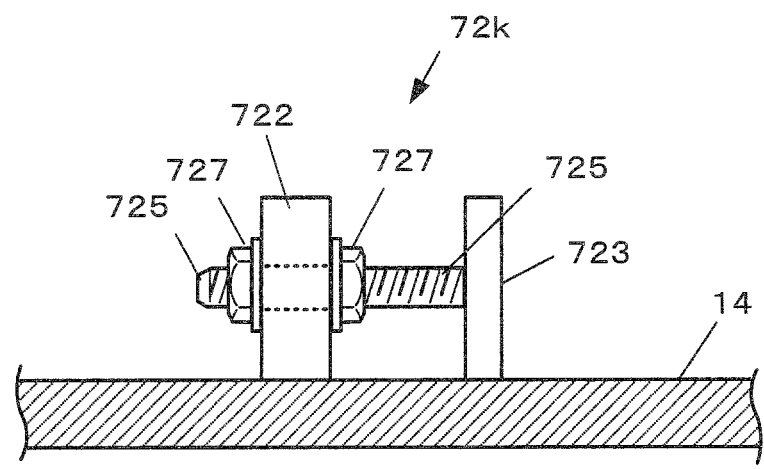
FIG. 11 is a diagram illustrating a modification (2) of the track-side stopper.

The base 722 is fixed to the upper surface of bottom of the main frame 14. The engagement body 723 includes integrally an adjustment bolt 725. The base 722 and the spacer 73 have an insertion hole for the adjustment bolt 725. The spacer 73 is sandwiched between the base 722 and the engagement body 723 and fixed integrally by the adjustment bolt 725 and a nut 727. Alternatively, as illustrated in FIG. 11, the spacer 73 may be omitted from the configuration illustrated in FIG. 10 so that the engagement body 723 is fixed to the base 722 by two nuts 727.

[3]

Figure 12:
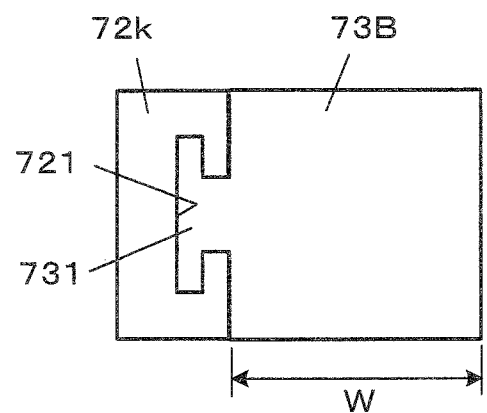
FIGS. 12(1) and 12(2) are diagrams illustrating a modification (3) of the track-side stopper.
Figure 12:
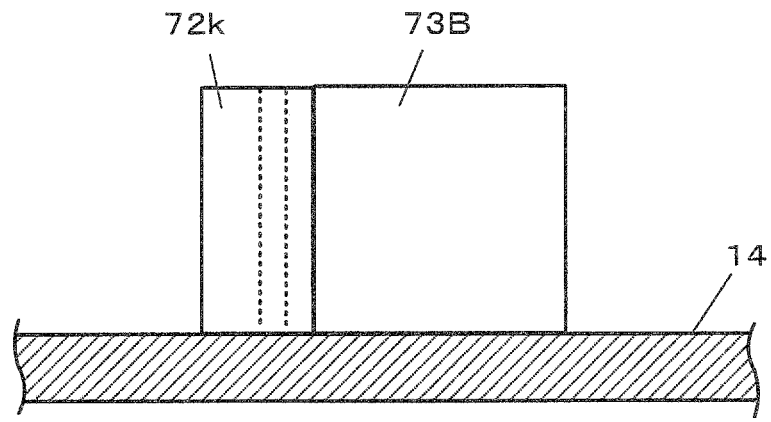

In addition, the form of engagement between the track-side stopper 72*k* and the spacer 73 is not limited to the example of FIG. 5 but may be another form as illustrated in FIG. 12.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A gap filler that protrudes a gap filler plate to a track side to prevent passengers' falling from a platform, comprising:
   a drive mechanism section;
   a first link lever section having a driving end and a driven end, the driving end being moved by driving of the drive mechanism section and the driven end being swung by movement of the driving end;
   a second link lever section having an input end section and an output end section, the input end section having a contact surface to contact the driven end and the output end section having a roller section changeable in installation position in a predetermined direction and being swung by movement of the input end section; and
   a driven slider that has a guide groove in which the roller section is capable of rolling to convert swing motion of the output end section into linear motion and move the gap filler plate in forward and backward movement directions,
   wherein
   an engagement relationship between the first link lever section and the second link lever section constitutes an inverse operation preventive structure that, when the gap filler plate is in either a fully protruded state or a fully stored state, enables only forward motion transfer from the first link lever section to the second link lever section,
   the guide groove is formed in a direction orthogonal or almost orthogonal to forward and backward movement directions of the gap filler plate, and
   the predetermined direction and the direction of the guide groove are parallel to each other in the fully stored state.

2. The gap filler as defined in claim 1, an angle formed by a central axis of the output end section and a central axis of the input end section being an obtuse angle starting at a center of a swing shaft of the second link lever section.

3. The gap filler as defined in claim 1, further comprising a movement restriction section that, for a forward and backward movable range of the gap filler plate, makes changeable a protrusion limit position according to the installation position of the roller section and fixes a storage limit position.

4. The gap filler as defined in claim 2, further comprising a movement restriction section that, for a forward and backward movable range of the gap filler plate, makes changeable a protrusion limit position according to the installation position of the roller section and fixes a storage limit position.

5. The gap filler as defined in claim 1, the output end section having a plurality of bolt holes into which a through bolt inserted into a rotation shaft of the roller section is screwed, the bolt holes being aligned in the predetermined direction.

6. The gap filler as defined in claim 2, the output end section having a plurality of bolt holes into which a through bolt inserted into a rotation shaft of the roller section is screwed, the bolt holes being aligned in the predetermined direction.

7. The gap filler as defined in claim 1, the output end section having a long hole and a fitting concave-convex section, the long hole being longer in the predetermined direction into which the through bolt is inserted via the roller section and the roller seat, the fitting concave-convex section fitting to the roller seat provided around the long hole.

8. The gap filler as defined in claim 2, the output end section having a long hole and a fitting concave-convex section, the long hole being longer in the predetermined direction into which the through bolt is inserted via the roller section and the roller seat, the fitting concave-convex section fitting to the roller seat provided around the long hole.

* * * * *